United States Patent [19]

Swetnam et al.

[11] Patent Number: 4,567,836

[45] Date of Patent: Feb. 4, 1986

[54] TRANSPLANTER MOUNTING ATTACHMENT FOR A HARVESTER

[75] Inventors: Larry D. Swetnam, Paris; James H. Casada; Linus R. Walton, both of Lexington, all of Ky.

[73] Assignee: University of Kentucky Research Foundation, Lexington, Ky.

[21] Appl. No.: 602,806

[22] Filed: Apr. 23, 1984

Related U.S. Application Data

[63] Continuation-in-part of Ser. No. 496,306, May 19, 1983, Pat. No. 4,540,054, and a continuation-in-part of Ser. No. 408,232, Aug. 16, 1982, Pat. No. 4,470,242, which is a continuation-in-part of Ser. No. 252,315, Apr. 9, 1981, Pat. No. 4,367,621.

[51] Int. Cl.$^4$ ............................................. A01C 11/00
[52] U.S. Cl. ........................................ 111/1; 111/3; 172/413; 280/492
[58] Field of Search ........................................ 111/1-3, 111/52-56, 59-68; 172/307, 310, 446, 459, 460, 322, 482, 413, 677, 748, 282, 397; 56/10.2, 121.1; 280/492-494

[56] References Cited

U.S. PATENT DOCUMENTS

| | | | |
|---|---|---|---|
| 1,844,124 | 2/1932 | Jordan | 172/413 X |
| 2,640,405 | 6/1953 | Wheeler | 172/310 X |
| 2,836,112 | 5/1958 | Griffin | 172/307 |
| 2,947,372 | 8/1960 | Olson | 111/52 X |
| 3,151,407 | 10/1964 | Schmidt et al. | 172/413 |
| 3,240,508 | 3/1966 | Clausen et al. | 172/310 |
| 4,191,262 | 3/1980 | Sylvester | 172/459 |

FOREIGN PATENT DOCUMENTS

| | | | |
|---|---|---|---|
| 213784 | 9/1957 | Australia | 111/3 |
| 831341 | 2/1952 | Fed. Rep. of Germany | 111/2 |
| 1129151 | 1/1957 | France | 111/3 |
| 1496033 | 9/1967 | France | 111/2 |
| 685181 | 9/1979 | U.S.S.R. | 111/3 |

Primary Examiner—James R. Feyrer
Attorney, Agent, or Firm—Birch, Stewart, Kolasch & Birch

[57] ABSTRACT

A transplanter mounting attachment for attachment to a crop harvester including a pivot shaft operatively connected for rotation about an axis extending longitudinally with respect to a support frame of a crop harvester. A rotating sleeve substantially orthogonally disposed with respect to the pivot shaft and rotatably mounted relative thereto. A connecting shaft substantially orthogonally disposed with respect to the pivot shaft and rotatably mounted relative thereto. At least one transplanter attaching assembly operatively connected to the rotating sleeve and being raised or lowered upon rotary motion being imparted to the rotating sleeve. Wheels are provided which are operatively connected to the connecting shaft for engaging the ground surface to support the transplanter attaching assembly. The transplanter attaching assembly is free to rotate about substantially horizontal axes which extend substantially parallel and perpendicular to the support frame of a crop harvester.

8 Claims, 6 Drawing Figures

TRANSPLANTER MOUNTING ATTACHMENT FOR A HARVESTER

CROSS-REFERENCE TO RELATED APPLICATIONS

This application is a continuation-in-part of copending application Ser. No. 408,232, filed Aug. 16, 1982, now U.S. Pat. No. 4,470,242 and is a continuation-in-part of copending application Ser. No. 496,306, filed May 19, 1983, now U.S. Pat. No. 4,540,054. application Ser. No. 408,232 is a continuation-in-part of application Ser. No. 252,315, filed Apr. 9, 1981, now U.S. Pat. No. 4,367,621.

BACKGROUND OF THE INVENTION

1. Field of the Invention

The present invention is directed to an attachment designed to be mounted on the rear portion of a harvester for planting seedling crops.

2. Description of Background Art

In cultivating certain crops it is conventional to actually propagate the plant as a seedling and thereafter transplant the seedling into an area in which the seedling will grow into a mature plant. The Burroughs U.S. Pat. No. 2,804,033, discloses a plant setting machine which is connected to a conventional tractor by means of the hitch bar 40 and arm attachments 46, 48. The plant setting machine is mounted on wheels 96 which support the entire weight of the machine on the ground surface.

The Martin U.S. Pat. No. 3,306,239, discloses a transplanting machine which is connected by means of a bar 10 to a tractor T. The weight of the machine is supported on the wheels 9. Similarly, Webster, U.S. Pat. No. 4,177,743, discloses a transplanter 10 which is connected by means of a rod 14 to a tractor T. The machine is supported on the wheels 20 during operation.

Additional planting machines which employ a seedling handling mechanism together with a tractor are disclosed by Braun et al, U.S. Pat. No. 4,111,135; Boa et al, U.S. Pat. No. 4,341,333 and Paladino, U.S. Pat. No. 4,364,316. These transplanting machines are similar to the machines discussed hereinabove and support the entire weight of the seedling handling device on wheels specifically provided for that purpose.

SUMMARY AND OBJECTS OF THE INVENTION

It is an object of the present invention to provide a transplanter mounting attachment for a conventional crop harvester.

Another object of the invention is to provide a transplanter mounting attachment which is connected to a hydraulic system for raising and lowering the transplanter mounting attachment into and out of engagement with the ground surface.

A further object of the present invention is to provide a transplanter mounting attachment which may be attached to a crop harvester without having a detrimental effect on the functioning of the crop harvester.

These and other objects of the present invention are accomplished by providing a transplanter mounting attachment which may be easily attached to and detached from the support frame of a crop harvester without affecting the harvesting function. More specifically, the transplanter mounting attachment is designed to be mounted on the rear portion of a crop harvester for planting seedling crops. The transplanter mounting attachment is designed to have rotational freedom about horizontal axes, both parallel and perpendicular to the harvester frame. The transplanters are mounted to the mounting attachment such that an obstruction encountered by one transplanter does not interfere with the operation of the other transplanter. Raising, lowering and operating depth of the transplanters are controlled with a single double-acting hydraulic cylinder. Assist wheels are provided for supporting the entire weight of the transplanters and workers when the transplanters are raised and only a portion of the weight when the transplanters are at an operating depth.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
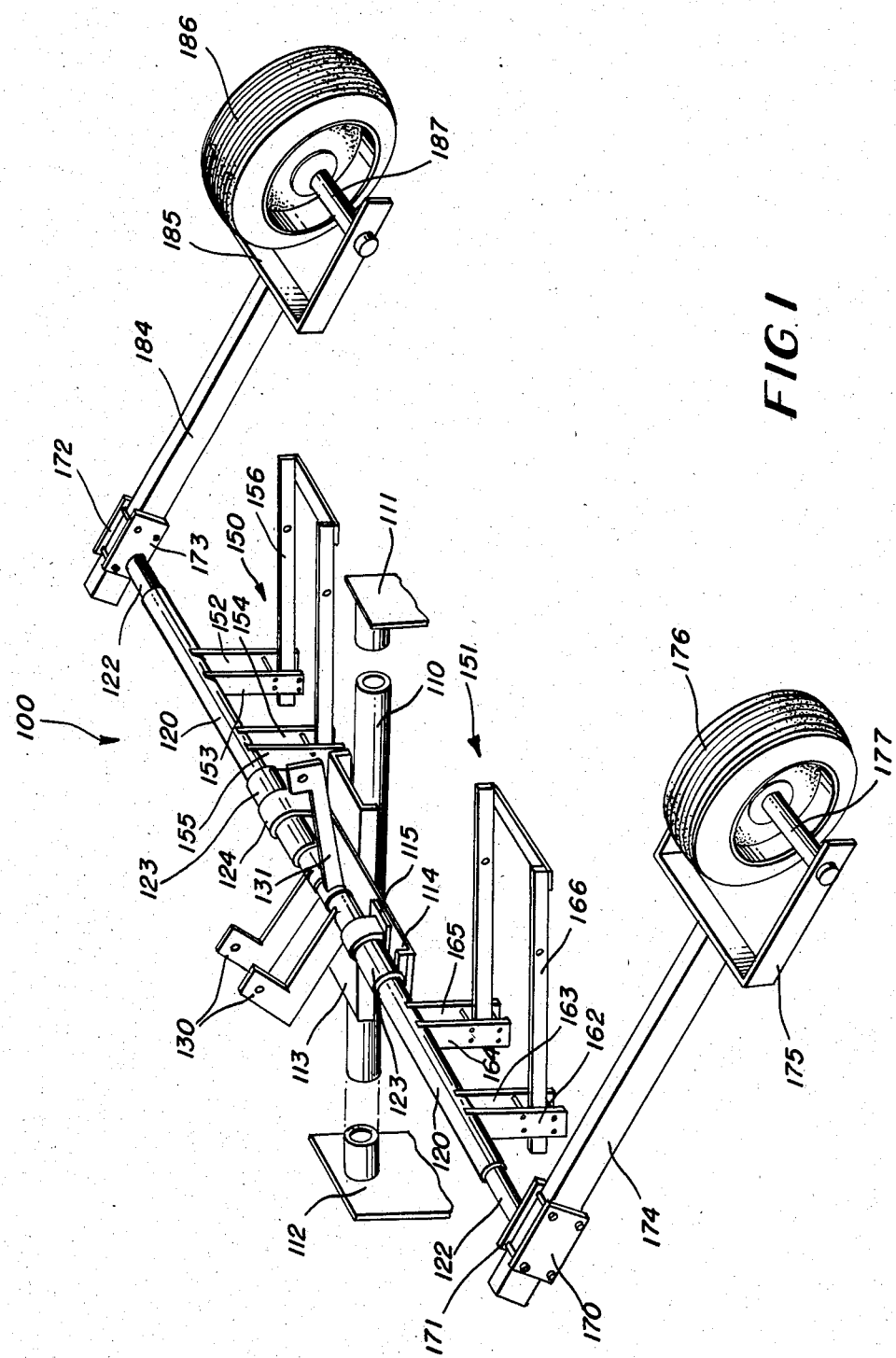
FIG. 1 is a perspective view illustrating the transplanter mounting attachment according to the present invention.
Figure 2:
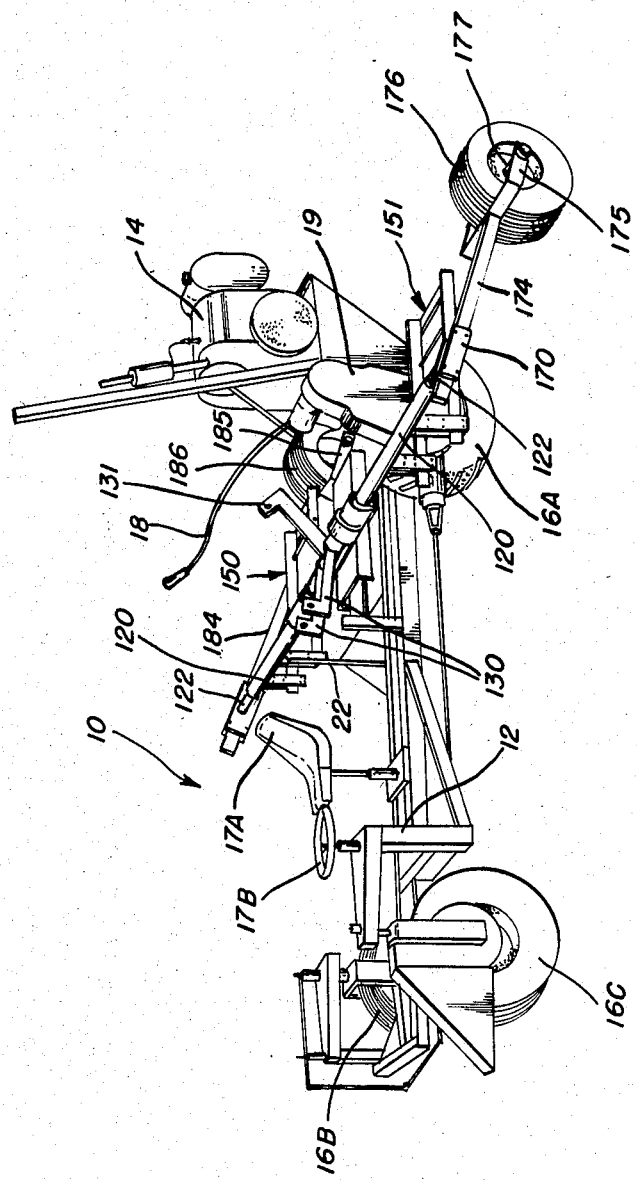
FIG. 2 is a perspective view illustrating the transplanter mounting attachment connected to a crop harvester.

As illustrated in FIGS. 1 and 2, the present invention is directed to a transplanter mounting attachment 100 which is adapted to be connected to a harvesting aid 10. The harvesting aid 10 includes a support frame 12 which is mounted on at least three wheels 16A, 16B and 16C. As illustrated in FIG. 2, the rear wheel 16A is operatively connected to a motor 14 by means of a chain drive 19. A control rod 18 controls the speed and the movement of the harvesting aid 10.

An operator's seat 17A is positioned on the support frame 12 adjacent to the front end thereof. Positioned in close proximity to the operator's seat 17A is a steering wheel 17B which may be utilized by the operator to steer the harvesting aid 10. The control rod 18 is utilized by the operator to control the movement of the harvesting aid 10 while seedling plants are being positioned in an open field.

As illustrated in FIGS. 1, 2, 4, 5 and 6, the transplanter mounting attachment 100 includes a pivot shaft 110 operatively connected to the chassis attachment members 111, 112. A support housing 113 is affixed to the pivot shaft 110 and provides a mounting member to which the remaining portion of the transplanter mounting attachment 100 is affixed. A transverse support member 114 is orthogonally positioned with respect to the support housing 113. A flange 115 is operatively connected to the transverse support 114.

A rotating sleeve 120 is operatively positioned with a connecting shaft 122 rotatably disposed therein. A rotating sleeve 120 is mounted on each side of the pivot shaft 110. Each rotating sleeve 120 is positioned in a support sleeve 123, which surrounds a portion of each rotating sleeve 120 and guides the rotational movement thereof. Holding brackets 124 are mounted to confine the movement of the supporting sleeves 123 and the rotating sleeve 120. The holding brackets 124 are fixed to the transverse support 114 which is fixed to the support housing 113. Hydraulic cylinder attachment arms 130 are affixed to one end of the rotating sleeve 120. Similarly, a hydraulic cylinder attachment arm 131 is affixed to the connecting shaft 122. A hydraulic cylinder 140 is operatively positioned between the hydraulic cylinder attachment arms 130, 131. By actuating the hydraulic cylinder 140 and moving the hydraulic cylinder arm 131, rotation is imparted to the connecting shaft 122. Similarly, by imparting rotation to the hydraulic cylinder actuating arms 130, rotation is imparted to the rotating sleeve 120.

Transplanter attaching assemblies 150, 151 are operatively connected to each side of the rotating sleeve 120. The transplanter attaching assembly 150 includes arms 152, 153, 154 and 155 which are affixed to a first end of the rotating sleeve 120. The arms 152–155 operatively support a chassis 156 which projects rearwardly from the arms 152–155. Similarly, the transplanter attaching assembly 151 includes arms 162, 163, 164 and 165 which are affixed to the other side of the rotating sleeve 120. The arms 162–165 operatively support a chassis 166 which projects rearwardly therefrom.

The connecting shaft 122 includes a frame member 170, 171, 172 and 173 operatively connected to respective ends thereof. The frame members 170, 171 operatively retain a wheel frame support 174 which includes a U-shaped element 175 affixed to one end thereof. The U-shaped element 175 retains a wheel 176 on an axle 177. Similarly, the frame members 172, 173 retain the wheel frame support 184 which includes a U-shaped member 185 affixed to one end thereof. A wheel 186 is operatively retained relative to the U-shaped member 185 on an axle 187.

Figure 3:
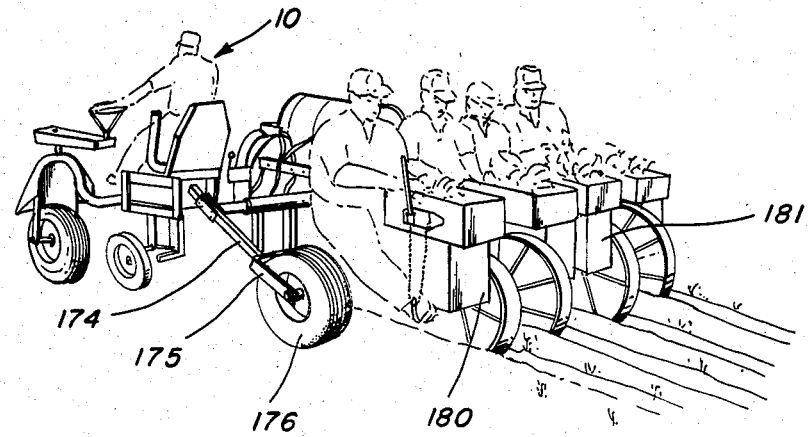
FIG. 3 is a perspective view illustrating the transplanter mounting attachment connected to a crop harvester with two transplanters operatively connected thereto.

As illustrated in FIG. 3, the transplanter mounting attachment 100 may be utilized to connect two one-row transplanters to the rear portion of the harvesting aid 10. The transplanters are designed to position two individuals on each transplanter to assist each other in planting seedling crops.

Figure 4:
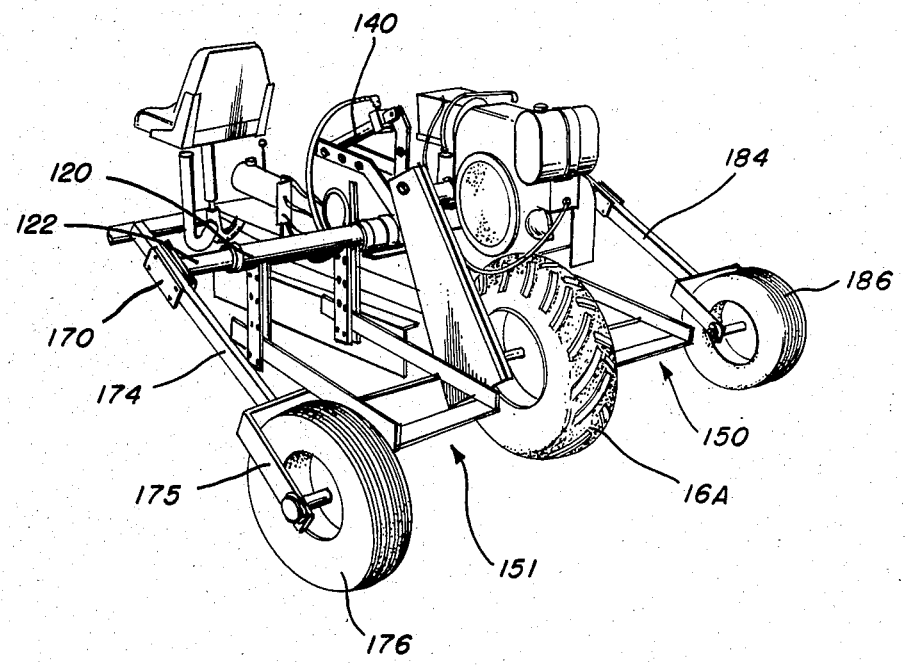
FIG. 4 is a perspective view illustrating the transplanter mounting attachment connected to the frame of a crop harvester.
Figure 5:
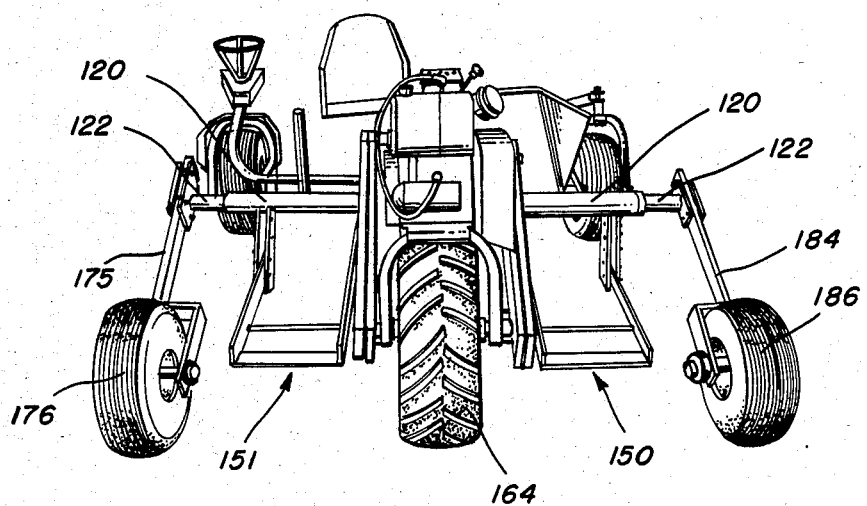
FIG. 5 is a rear view illustrating the transplanter mounting attachment connected to a crop harvester.
Figure 6:
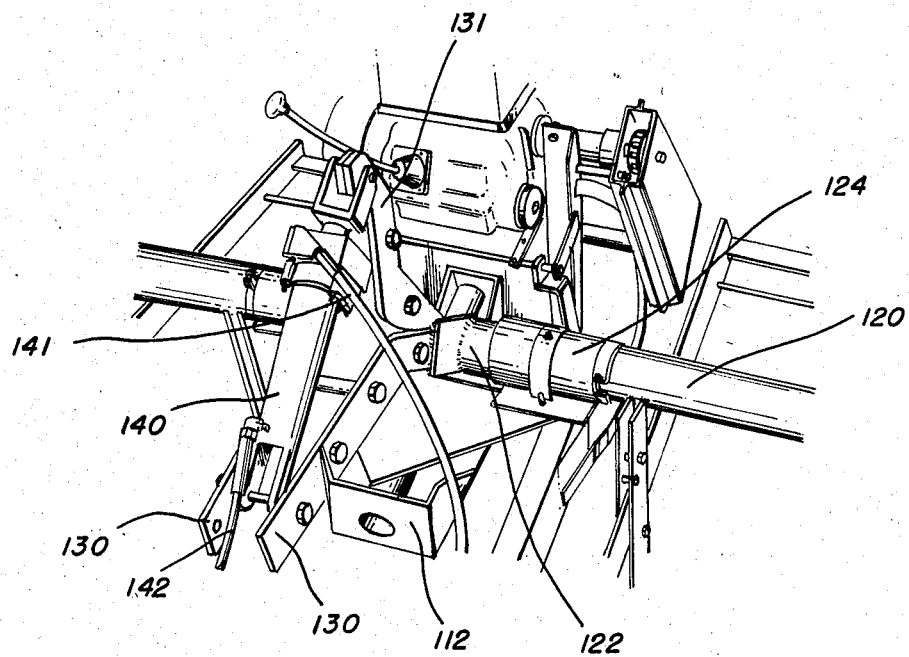
FIG. 6 is an enlarged view illustrating the mechanical connection between the transplanter mounting attachment and the single hydraulic cylinder for actuating same.

As illustrated in FIG. 4, when the hydraulic cylinder 140 is actuated, it imparts movement to the hydraulic cylinder attachment arms 130, 131. By imparting movement to the hydraulic attachment arms 130, the rotating sleeve 120 is rotated so as to raise or lower the transplanter attachment assemblies 150, 151. When the hydraulic cylinder 140 is actuated to impart movement to the hydraulic cylinder attachment arm 131, rotation is imparted to the connecting shaft 122 which raises or lowers the wheel frame supports 174, 184 to bring the wheels 176, 186 into or out of engagement with the ground surface.

In operation, when the transplanter mounting attachment 100 is not being utilized, hydraulic fluid is supplied through hydraulic lines 141, 142 and the hydraulic cylinder 140 is actuated to raise the hydraulic cylinder arm 131 thereby rotating the connecting shaft 122 to raise the wheel frame supports 174, 184 upwardly, thereby disengaging the wheels 176, 186 from the ground surface. The hydraulic cylinder attaching arms 130 are also actuated by the hydraulic cylinder 140 so as to impart rotation to the rotating sleeve 120, thereby raising the transplanter attaching assemblies 150, 151 upwardly to disengage the transplanters 180, 181 from the ground surface. In this operative mode, the transplanter mounting attachment 100 completely supports the weight of the transplanters 180, 181 and the individuals who are positioned on the transplanters.

When the harvesting aid 10 is positioned in an open field and it is desired to transplant seedlings into the ground surface, hydraulic fluid is supplied through the hydraulic lines 141, 142 and the hydraulic cylinder 140 is actuated to impart movement to the hydraulic cylinder attachment arm 131, thereby rotating the connecting shaft 122 downwardly to engage the wheels 176, 186 with the ground surface. In addition, the hydraulic cylinder 140 is actuated to impart movement to the hydraulic cylinder attachment arms 130, thereby rotating the rotating sleeve 120 to move the transplanter attaching assemblies 150, 151 downwardly so as to permit the transplanters 180, 181 to engage the ground surface. In this operative position, the wheels 176, 186 only support a portion of the weight of the individuals and the transplanters 180, 181 when the transplanters are planting seedling crops at an operating depth.

The transplanter mounting attachment 100 of the present invention permits rotational freedom about horizontal axes both parallel and perpendicular to the frame of the harvesting aid 10. More specifically, the pivot shaft 110 is mounted to permit rotation of the transplanter mounting attachment 100 about the frame 12 of the harvesting aid 10. In this manner, as one of the transplanters 180, 181 engages an obstacle in the ground surface, the wheel frame support 174, 184 may pivot upwardly or downwardly so that the obstruction encountered by one of the transplanters 180, 181 does not interfere with the operation of the other transplanter. In addition, the transplanter mounting attachment 100 may be pivoted upwardly about the the rotating sleeve 120 and the connecting shaft 122 to permit the wheels 176, 186 and the transplanters 180, 181 to be moved into and out of engagement with the ground surface. Thus, the transplanter mounting attachment 100 permits two degrees of rotational freedom about horizontal axes which extend both parallel with the frame member 12 and perpendicular to the frame member 12. This feature allows the maintenance of proper transplanter attitude even when uneven terrain is encountered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A transplanter mounting attachment for attachment to a crop harvester comprising:
   a pivot shaft operatively connected for rotation about an axis extending longitudinally with respect to a support frame of a crop harvester;
   a rotating sleeve substantially orthogonally disposed with respect to said pivot shaft and rotatably mounted relative thereto;
   a connecting shaft substantially orthogonally disposed with respect to said pivot shaft and rotatably mounted relative thereto;
   at least one transplanter attaching assembly operatively connected to said rotating sleeve and being raised or lowered upon rotary motion being imparted to said rotating sleeve; and
   wheels operatively connected to said connecting shaft for engaging the ground surface to support said transplanter attaching assembly;
   wherein said transplanter attaching assembly is free to rotate about substantially horizontal axes which extend substantially parallel and perpendicular to the support frame of a crop harvester.

2. A transplanter mounting attachment according to claim 1, wherein said rotating sleeve and said connecting shaft are coaxially arranged with respect to each other.

3. A transplanter mounting attachment according to claim 1, wherein two rotating sleeves are provided one being positioned on each side of said pivot shaft.

4. A transplanter mounting attachment according to claim 1, wherein said transplanter attaching assembly includes arms affixed to said rotating sleeve and a chassis affixed to said arms and extending along the length of said pivot shaft.

5. A transplanter mounting attachment according to claim 1, wherein two transplanter attaching assemblies are provided one being positioned on each side of said pivot shaft.

6. A transplanter mounting attachment according to claim 1, and further including chassis attachment members affixed to said support frame of said crop harvester and rotatably supporting said pivot shaft.

7. A transplanter mounting attachment according to claim 1, and further including hydraulic cylinder attachment arms fixed to said rotating sleeve and a hydraulic cylinder attachment arm fixed to said connecting shaft for imparting rotary movement to said rotating sleeve and said connecting shaft.

8. A transplanter mounting attachment according to claim 7, and further including a hydraulic cylinder operatively connected to said hydraulic cylinder attachment arms for selectively imparting movement thereto.

* * * * *